United States Patent
Jiang

(10) Patent No.: US 11,784,757 B2
(45) Date of Patent: Oct. 10, 2023

(54) METHOD, APPARATUS AND COMPUTER PROGRAM

(71) Applicant: Nokia Technologies Oy, Espoo (FI)

(72) Inventor: Jian Jiang, Wuxi (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 6 days.

(21) Appl. No.: 16/975,021

(22) PCT Filed: Mar. 8, 2018

(86) PCT No.: PCT/CN2018/078405
§ 371 (c)(1),
(2) Date: Aug. 21, 2020

(87) PCT Pub. No.: WO2019/169596
PCT Pub. Date: Sep. 12, 2019

(65) Prior Publication Data
US 2021/0091892 A1    Mar. 25, 2021

(51) Int. Cl.
*H04L 1/1812*    (2023.01)
*H04L 1/1867*    (2023.01)

(52) U.S. Cl.
CPC .......... *H04L 1/1812* (2013.01); *H04L 1/1874* (2013.01)

(58) Field of Classification Search
CPC ..................... H04L 1/1812; H04L 1/1874
See application file for complete search history.

(56) References Cited

U.S. PATENT DOCUMENTS

| 9,883,420 B2 | 1/2018 | Narasimha et al. |
| 2005/0232183 A1 | 10/2005 | Sartori et al. |
| 2007/0230335 A1* | 10/2007 | Sang ............... H04L 47/822 370/252 |
| 2008/0304416 A1* | 12/2008 | Fodor ............... H04W 28/0284 370/237 |
| 2010/0097976 A1 | 4/2010 | Agrawal et al. |
| 2011/0173517 A1* | 7/2011 | Kim .................. H04L 27/3488 714/776 |
| 2012/0236763 A1 | 9/2012 | Lucani et al. |

(Continued)

FOREIGN PATENT DOCUMENTS

| CA | 2223193 A1 * | 6/1999 | ............ H04L 45/00 |
| CN | 106304237 A | 1/2017 | |

(Continued)

OTHER PUBLICATIONS

Extended European Search Report received for corresponding European Patent Application No. 18908970.9, dated Sep. 21, 2021, 10 pages.

(Continued)

*Primary Examiner* — Elton Williams
(74) *Attorney, Agent, or Firm* — ALSTON & BIRD LLP

(57) ABSTRACT

There is provided a method comprising receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

20 Claims, 8 Drawing Sheets

(56) References Cited

U.S. PATENT DOCUMENTS

| | | | |
|---|---|---|---|
| 2012/0314655 A1* | 12/2012 | Xue | H04L 1/0076 370/328 |
| 2014/0254469 A1 | 9/2014 | Stephens et al. | |
| 2017/0150299 A1 | 5/2017 | Coutinho et al. | |
| 2018/0054248 A1 | 2/2018 | Kahtava et al. | |
| 2018/0063853 A1 | 3/2018 | Szabo et al. | |
| 2018/0295481 A1* | 10/2018 | Kahtava | H04W 4/40 |
| 2020/0228194 A1* | 7/2020 | Hassan Hussein | H04B 7/18513 |

FOREIGN PATENT DOCUMENTS

| | | |
|---|---|---|
| CN | 107147471 A | 9/2017 |
| CN | 107409345 A | 11/2017 |
| EP | 1450535 A1 | 8/2004 |
| FR | 3053193 A1 | 12/2017 |
| WO | 2009127141 A1 | 10/2009 |
| WO | 2017/030338 A1 | 2/2017 |
| WO | WO 2017/220938 A1 | 12/2017 |

OTHER PUBLICATIONS

Huang et al., "Scheduling and Network Coding for Relay-Aided Wireless Broadcast: Optimality and Heuristic", IEEE Transactions on Vehicular Technology, vol. 63, No. 2, Feb. 2014, pp. 674-687.

Magli et al., "Network Coding Meets Multimedia: A Review", IEEE Transactions on Multimedia, vol. 15, No. 5, Aug. 2013, pp. 1195-1212.

Hu et al., "An efficient network coding based multicast retransmission scheme for mobile communication networks with relays", IEEE International Conference on Communications (ICC), Jun. 10-15, 2012, pp. 5413-5417.

Pisinger, "The quadratic knapsack problem—a survey", Discrete Applied Mathematics, vol. 155, No. 5, Mar. 15, 2007, pp. 623-648.

Zhu et al., "Multiple Vehicles Collaborative Data Download Protocol via Network Coding", IEEE Transactions on Vehicular Technology, vol. 64, No. 4, Apr. 2015, pp. 1607-1619.

Lu et al., "Efficient Scheduling for Relay-aided Broadcasting with Random Network Codes", IEEE 22nd International Symposium on Personal, Indoor and Mobile Radio Communications, 2011, 5 pages.

Nguyen et al., "Wireless Broadcast Using Network Coding", IEEE Transactions on Vehicular Technology, vol. 58, No. 2, Feb. 2009, pp. 914-925.

International Search Report and Written Opinion received for corresponding Patent Cooperation Treaty Application No. PCT/CN2018/078405, dated Nov. 30, 2018, 10 pages.

Office Action for Chinese Application No. 201880090878.5 dated Jan. 28, 2023, 14 pages.

Office Action for European Application No. 18908970.9 dated Feb. 22, 2023, 4 pages.

Office Action for Chinese Application No. 201880090878.5 dated Aug. 10, 2023, 10 pages.

\* cited by examiner

METHOD, APPARATUS AND COMPUTER PROGRAM

RELATED APPLICATION

This application claims priority to PCT Application No. PCT/CN2018/078405, filed on Mar. 8, 2018 which is incorporated herein by reference in its entirety.

FIELD

The present application relates to a method, apparatus, system and computer program and in particular but not exclusively to network coding in a vehicle-to-vehicle (V2V) network.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided a method comprising receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

The method may comprise receiving first feedback information, from the user equipment at the apparatus, the first feedback information associated with at least one of the network coded blocks from the base station and determining at least one of the decoded blocks in the memory to be sent to the user equipment from the apparatus based on the first feedback information.

The network coded blocks may include a time stamp. The method may comprise determining at least one of the decoded blocks in the memory to be sent to the user equipment from the apparatus based on the time stamp.

Determining at least one of the decoded blocks in the memory to be sent to the user equipment from the apparatus may comprise solving a multiple knapsack problem.

The method may comprise receiving second feedback information from the user equipment at the apparatus, the second feedback information associated with the at least one block caused to be sent to the user equipment from the apparatus and causing the associated at least one block to be removed from the memory based on the second feedback information.

The network coded blocks may be coded using random linear network coding.

The method may comprise causing the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In a second aspect there is provided an apparatus, the apparatus comprising means for receiving, from a base station, data information comprising network coded blocks, means for decoding the network coded blocks, means for storing the decoded blocks in a memory, means for determining, based on an attribute, at least one of the decoded blocks in the memory to be sent to a user equipment and means for causing the determined at least one of the decoded blocks to be sent to the user equipment from the apparatus using network coding.

The apparatus may comprise means for receiving first feedback information, from the user equipment at the apparatus, the first feedback information associated with at least one of the network coded blocks from the base station and means for determining at least one of the decoded blocks in the memory to be sent to the user equipment from the apparatus based on the first feedback information.

The network coded blocks may include a time stamp. The apparatus may comprise means for determining at least one of the decoded blocks in the memory to be sent to the user equipment from the apparatus based on the time stamp.

Means for determining at least one of the decoded blocks in the memory to be sent to the user equipment from the apparatus may comprise means for solving a multiple knapsack problem.

The apparatus may comprise means for receiving second feedback information from the user equipment, the second feedback information associated with the at least one block caused to be sent to the user equipment from the apparatus and means for causing the associated at least one block to be removed from the memory based on the second feedback information.

The network coded blocks may be coded using random linear network coding.

The apparatus may comprise means for causing the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In a third aspect there is provided an apparatus comprising at least one processor and at least one memory including a computer program code, the at least one memory and the computer program code configured to, with the at least one processor, cause the apparatus at least to:
receive, from a base station, data information comprising network coded blocks, decode the network coded blocks, store the decoded blocks in a memory, determine, based on an attribute, at least one of the decoded blocks in the memory to be sent to a user equipment and cause the determined at least one of the decoded blocks to be sent to the user equipment from the apparatus using network coding.

The apparatus may be configured to receive first feedback information, from the user equipment at the apparatus, the first feedback information associated with at least one of the network coded blocks from the base station and to determine at least one of the decoded blocks in the memory to be sent to the user equipment from the apparatus based on the first feedback information.

The network coded blocks may include a time stamp. The apparatus may be configured to determine at least one of the decoded blocks in the memory to be sent to the user equipment from the apparatus based on the time stamp.

The apparatus may be configured to solve a multiple knapsack problem.

The apparatus may be configured to receive second feedback information from the user equipment, the second feedback information associated with the at least one block caused to be sent to the user equipment from the apparatus and to cause the associated at least one block to be removed from the memory based on the second feedback information.

The network coded blocks may be coded using random linear network coding.

The apparatus may be configured to cause the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In a fourth aspect there is provided a communication system comprising a base station comprising means for providing data information comprising network coded blocks, a user equipment comprising means for receiving data information comprising network coded blocks and an apparatus comprising means for receiving, from a base station, data information comprising network coded blocks, means for decoding the network coded blocks, means for storing the decoded blocks in a memory, means for determining, based on an attribute, at least one of the decoded blocks in the memory to be sent to a user equipment and means for causing the determined at least one of the decoded blocks to be sent to the user equipment from the apparatus using network coding.

The apparatus may comprise means for receiving first feedback information, from the user equipment at the apparatus, the first feedback information associated with at least one of the network coded blocks from the base station and means for determining at least one of the decoded blocks in the memory to be sent to the user equipment from the apparatus based on the first feedback information.

The network coded blocks may include a time stamp. The apparatus may comprise means for determining at least one of the decoded blocks in the memory to be sent to the user equipment from the apparatus based on the time stamp.

Means for determining at least one of the decoded blocks in the memory to be sent to the user equipment from the apparatus may comprise means for solving a multiple knapsack problem.

The apparatus may comprise means for receiving second feedback information from the user equipment, the second feedback information associated with the at least one block caused to be sent to the user equipment from the apparatus and means for causing the associated at least one block to be removed from the memory based on the second feedback information.

The network coded blocks may be coded using random linear network coding.

The apparatus may comprise means for causing the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In a fifth aspect there is provided a computer-readable medium comprising program instructions for causing an apparatus to perform at least the following: receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

The program instructions may cause the apparatus to perform receiving first feedback information, from the user equipment at the apparatus, the first feedback information associated with at least one of the network coded blocks from the base station and determining at least one of the decoded blocks in the memory to be sent to the user equipment from the apparatus based on the first feedback information.

The network coded blocks may include a time stamp. The program instructions may cause an apparatus to perform determining at least one of the decoded blocks in the memory to be sent to the user equipment from the apparatus based on the time stamp.

Determining at least one of the decoded blocks in the memory to be sent to the user equipment from the apparatus may comprise solving a multiple knapsack problem.

The program instructions may cause an apparatus to perform receiving second feedback information from the user equipment at the apparatus, the second feedback information associated with the at least one block caused to be sent to the user equipment from the apparatus and causing the associated at least one block to be removed from the memory based on the second feedback information.

The network coded blocks may be coded using random linear network coding.

The program instructions may cause an apparatus to perform causing the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In a sixth aspect there is provided a non-transitory computer-readable medium comprising program instructions for causing an apparatus to perform at least the following: receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

The program instructions may cause the apparatus to perform receiving first feedback information, from the user equipment at the apparatus, the first feedback information associated with at least one of the network coded blocks from the base station and determining at least one of the decoded blocks in the memory to be sent to the user equipment from the apparatus based on the first feedback information.

The network coded blocks may include a time stamp. The program instructions may cause an apparatus to perform determining at least one of the decoded blocks in the memory to be sent to the user equipment from the apparatus based on the time stamp.

Determining at least one of the decoded blocks in the memory to be sent to the user equipment from the apparatus may comprise solving a multiple knapsack problem.

The program instructions may cause an apparatus to perform receiving second feedback information from the user equipment at the apparatus, the second feedback information associated with the at least one block caused to be sent to the user equipment from the apparatus and causing the associated at least one block to be removed from the memory based on the second feedback information.

The network coded blocks may be coded using random linear network coding.

The program instructions may cause an apparatus to perform causing the determined at least one of the decoded blocks to be sent to the user equipment from the apparatus using random linear network coding.

The apparatus may comprise a relay node.

The base station, user equipment and apparatus may be in a vehicle to vehicle network. The apparatus may comprise a roadside unit. The user equipment may comprise a vehicle user equipment.

In a seventh aspect there is provided a computer program comprising instructions for causing an apparatus to perform at least the following: receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

The instructions may cause the apparatus to perform receiving first feedback information, from the user equipment at the apparatus, the first feedback information associated with at least one of the network coded blocks from the base station and determining at least one of the decoded blocks in the memory to be sent to the user equipment from the apparatus based on the first feedback information.

The network coded blocks may include a time stamp. The instructions may cause an apparatus to perform determining at least one of the decoded blocks in the memory to be sent to the user equipment from the apparatus based on the time stamp.

Determining at least one of the decoded blocks in the memory to be sent to the user equipment from the apparatus may comprise solving a multiple knapsack problem.

The instructions may cause an apparatus to perform receiving second feedback information from the user equipment at the apparatus, the second feedback information associated with the at least one block caused to be sent to the user equipment from the apparatus and causing the associated at least one block to be removed from the memory based on the second feedback information.

The network coded blocks may be coded using random linear network coding.

The instructions may cause an apparatus to perform causing the determined at least one of the decoded blocks to be sent to the user equipment from the apparatus using random linear network coding.

The apparatus may comprise a relay node.

The base station, user equipment and apparatus may be in a vehicle to vehicle network.

The apparatus may comprise a roadside unit. The user equipment may comprise a vehicle user equipment.

In an aspect there is provided a computer program product for a computer, comprising software code portions for performing the steps of the method of the first aspect when said product is run on the computer.

In an aspect there is provided a computer program embodied on a non-transitory computer-readable storage medium, the computer program comprising program code for controlling a process to execute a process comprising the steps of the method of the first aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
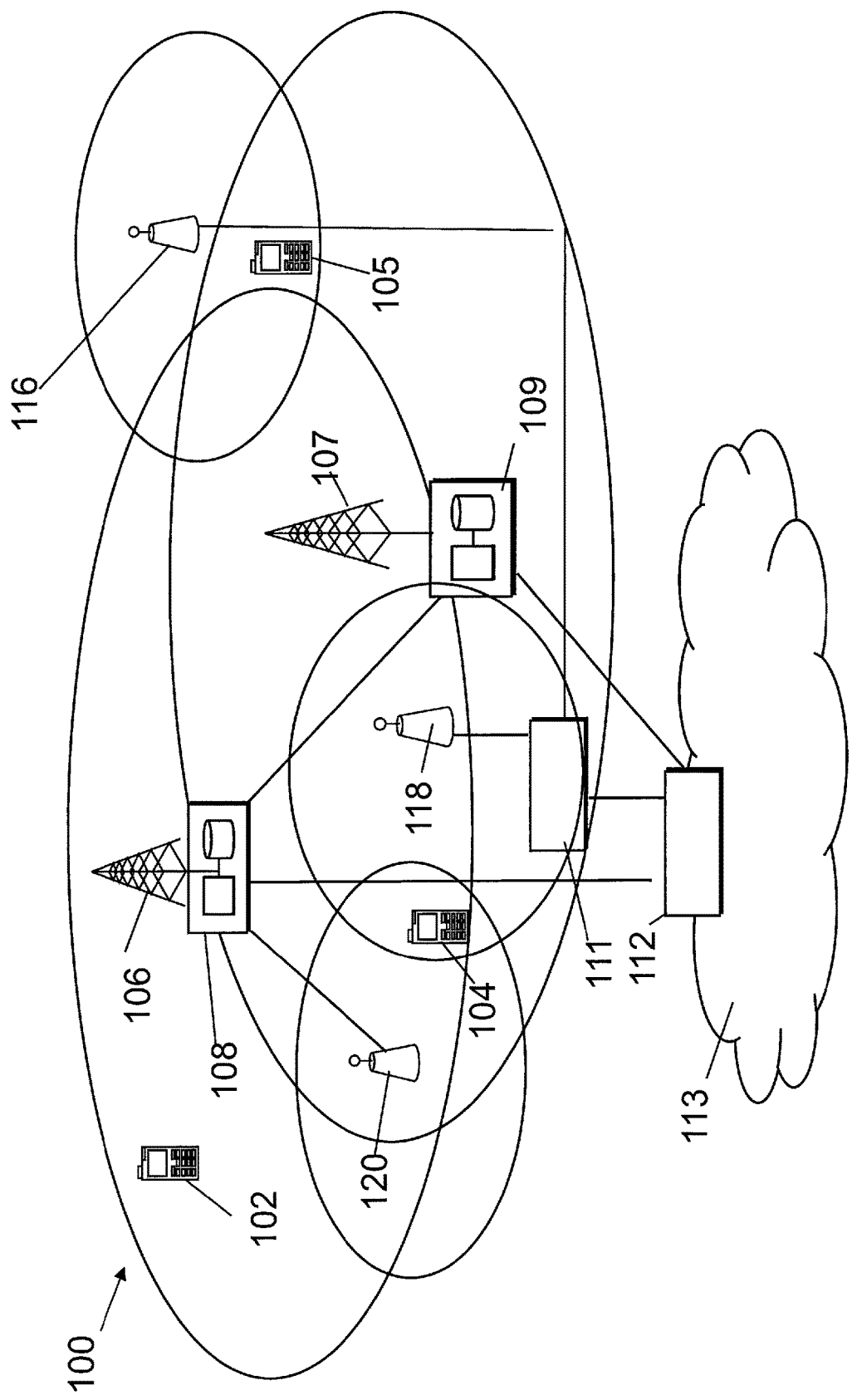
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 2:
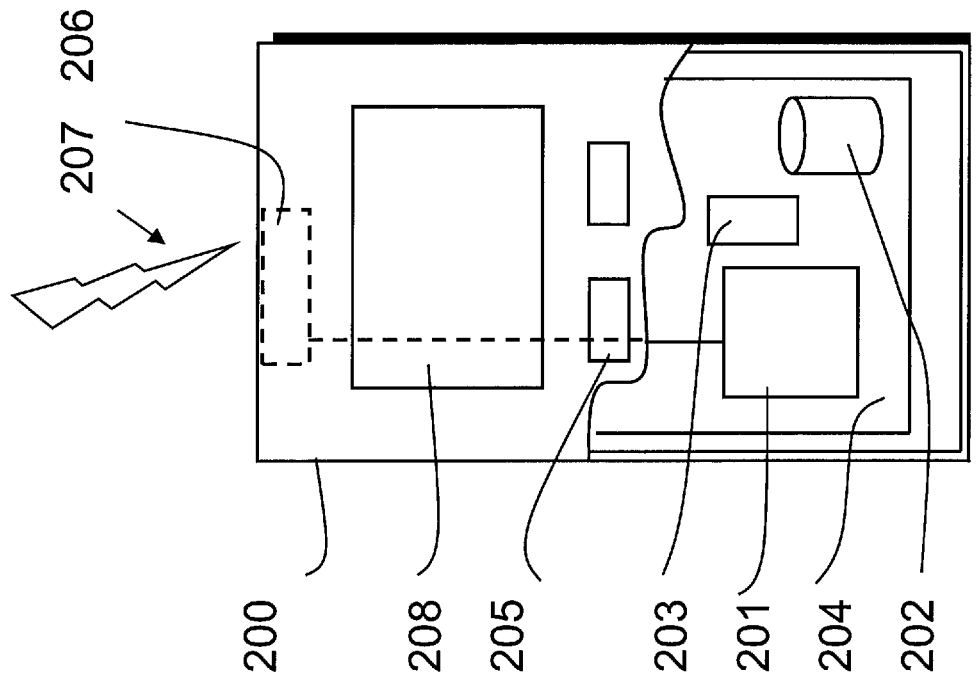
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
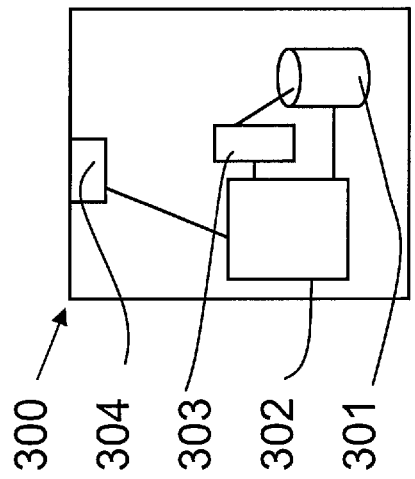
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB, a relay node or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Autonomous driving is the concept of operating a vehicle that is capable of sensing its environment without human input. With developments in digital chip design, image processing techniques, localization techniques, artificial intelligence, and so on, the concept of autonomous driving is becoming realisable.

To support various applications, such as collision avoidance, roadway reservation, and intersection management, etc., an integrated communication system network, known as vehicle-to-everything (V2X), has been proposed to enable vehicles to communicate with each other and beyond. V2X provides three types of communications, vehicle-to-vehicle (V2V), vehicle-to-pedestrian (V2P), and vehicle-to-infrastructure/network (V2I/N) referring to the communication between a vehicle and a roadside unit/network.

A road-side unit (RSU) may be a stationary server installed along the road to provide information services via V2I communication. An onboard unit (OBU) may be mounted on vehicles to enable both V2I and V2V communications Network coding may be an efficient method to enhance the performance of wireless networks. Network coding comprises transmitting a combination of (at least) two packets rather than two individual packets. Network coding may increase the throughput of the network and/or decrease the transmission power at each node.

Network coding may improve transmission efficiency via coding among information flows to different receivers, and/or the use of relay nodes, which can assist in the message delivery to cell-edge users.

Network coding can be classified into XOR (binary) coding and random linear coding. In binary coding, XOR operations are performed between the packets. In random network coding, a source sends coded packets of the form $\Sigma_{i=1}^{k} \alpha_i p_i$ where $\alpha_i$ is a random coefficient is chosen over a finite field (Galois field), and $p_i$ is the original packet. Each source node generates random linearly coded packets and sends them. Independent packets from each session are received at each destination node and decoded as linearly independent packets. The decoding process may be similar to solving a system of linear equations.

Figure 4:
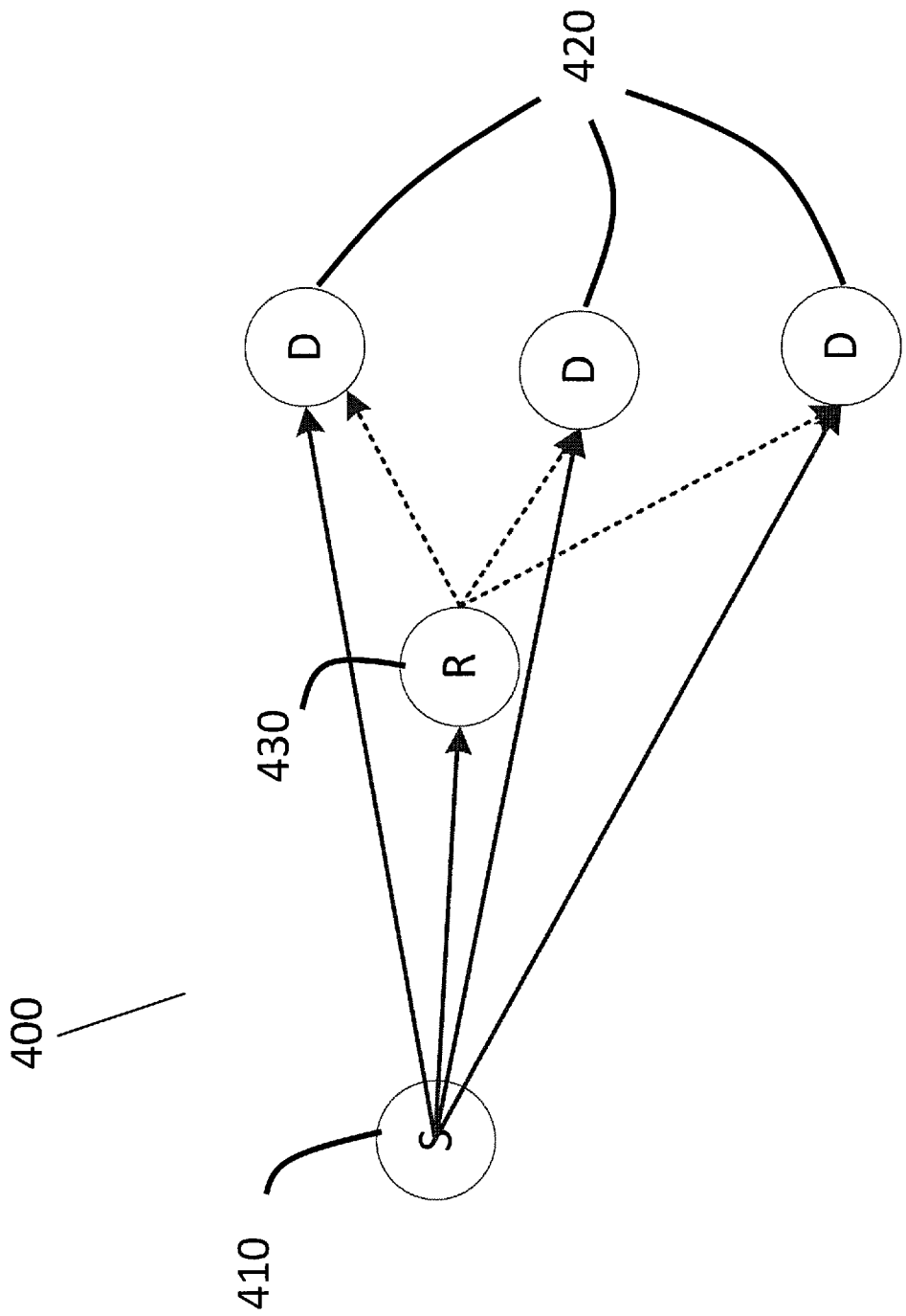
FIG. 4 shows a schematic diagram of an example architecture for relay aided linear network coding.

FIG. 4 shows an example architecture for relay aided linear network coding. The system 400 shown in FIG. 4 includes a BS or source node 410 ("S") and three receivers or destination nodes 420 ("D"). The system 400 includes a relay node 430 ("R") to assist the transmission. Although one relay node 430 is shown in the system 400 of FIG. 4, a relay aided system may include a plurality of relay nodes.

The overall transmission process in a relay aided system 400 includes two phases: the information transmission phase and the redundancy transmission phase. In the information phase, the source node 410 broadcasts M coded packets using random linear network coding. No feedback information is used during the information transmission phase.

During the redundancy transmission phase, on successfully receiving packets from the source node 410, the relay node 430 stores the received packets in a memory (or buffer) for further random network recoding and sending to the destination node 420.

Figure 5:
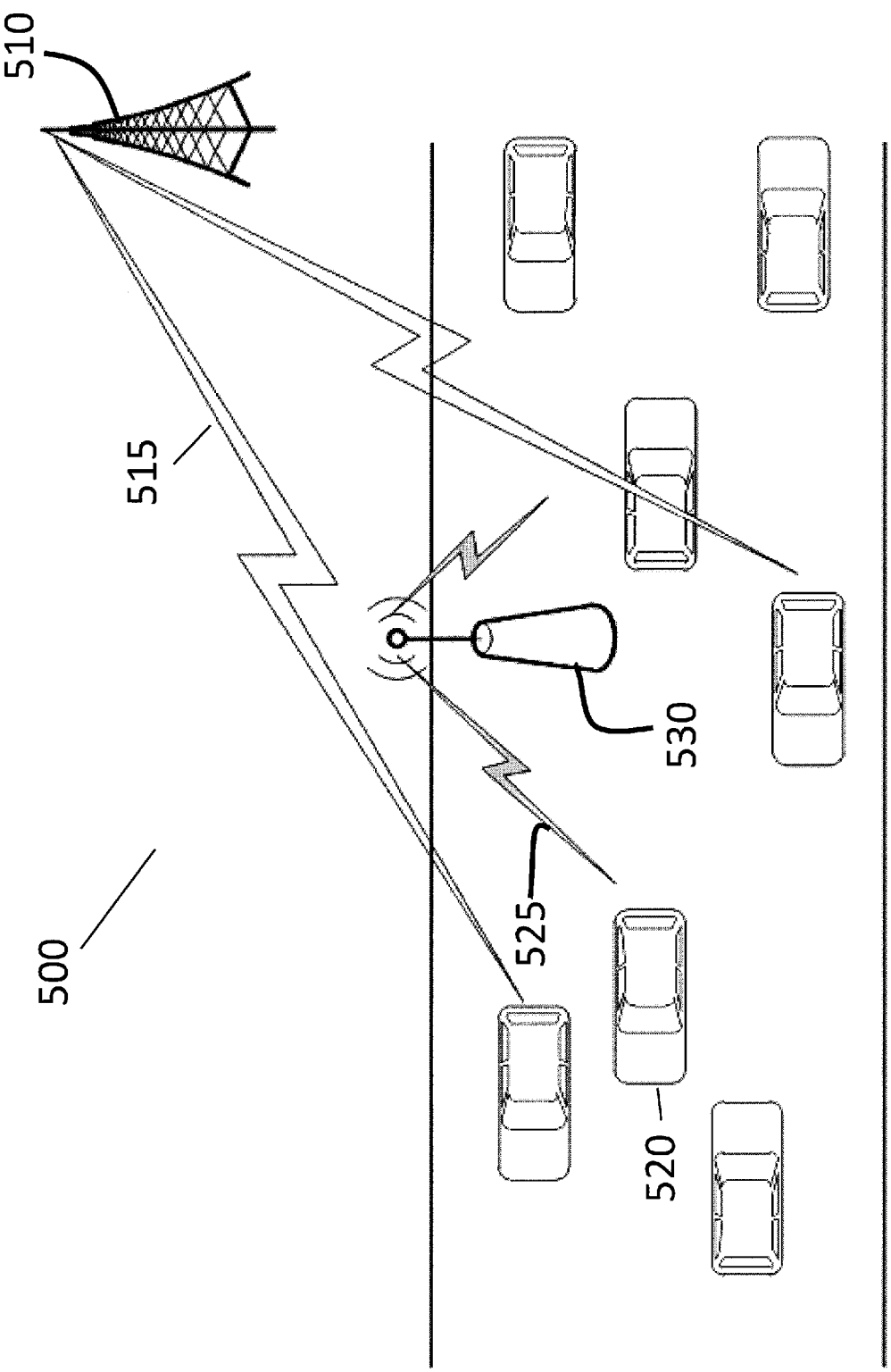
FIG. 5 shows a schematic diagram of an example V2V communication system.

A random linear network coding scheme may be applied in a V2X network. An example V2V communication system 500 is shown in FIG. 5. The example V2V communication system comprises one BS 510 (which may be, e.g., an eNB or gNB), one RSU 530, which acts as a relay node and multiple receiver, e.g. vehicle UE (VUE) 520.

The BS 510 is a transmitter whose purpose is to disseminate message to VUE 520. The BS broadcasts packets to the VUEs inside the range of the BS 510. Due, for example, to the distance between the BS 510 and the VUE 520, and/or the power of VUE 520, the packets may not reach the VUE 520. The RSU 530 may act as a relay node to assist VUE data decoding. The RSU 530 collects data packets from the BS 510. Assuming the RSU 530 can decode and acquire source code, the RSU 530 encodes the packets again using linear networking coding then sends the encoded packets to the VUE 520. The VUE 520 receives data packets from the BS 510 and RSU 530, decodes the packets and sends feedback to the RSU 530 and BS 510.

In a relay aided linear network coded system, it is assumed that the BS-to-relay channel is better than all the BS-to-UE channels 515 and that the relay-to-UE channels 525 are better than the corresponding BS-to-UE channels 515. Moreover, it is assumed that the erasure probabilities are time-invariant and known at both the BS and the relay.

The data packets from the BS 510 which were not correctly decoded by a receiver are valuable for network coding at the relay node. That is, it may be beneficial for an RSU 530 to know the VUE data status to decide which packet will be selected for encoding and transmission to the VUE 520.

Figure 6:
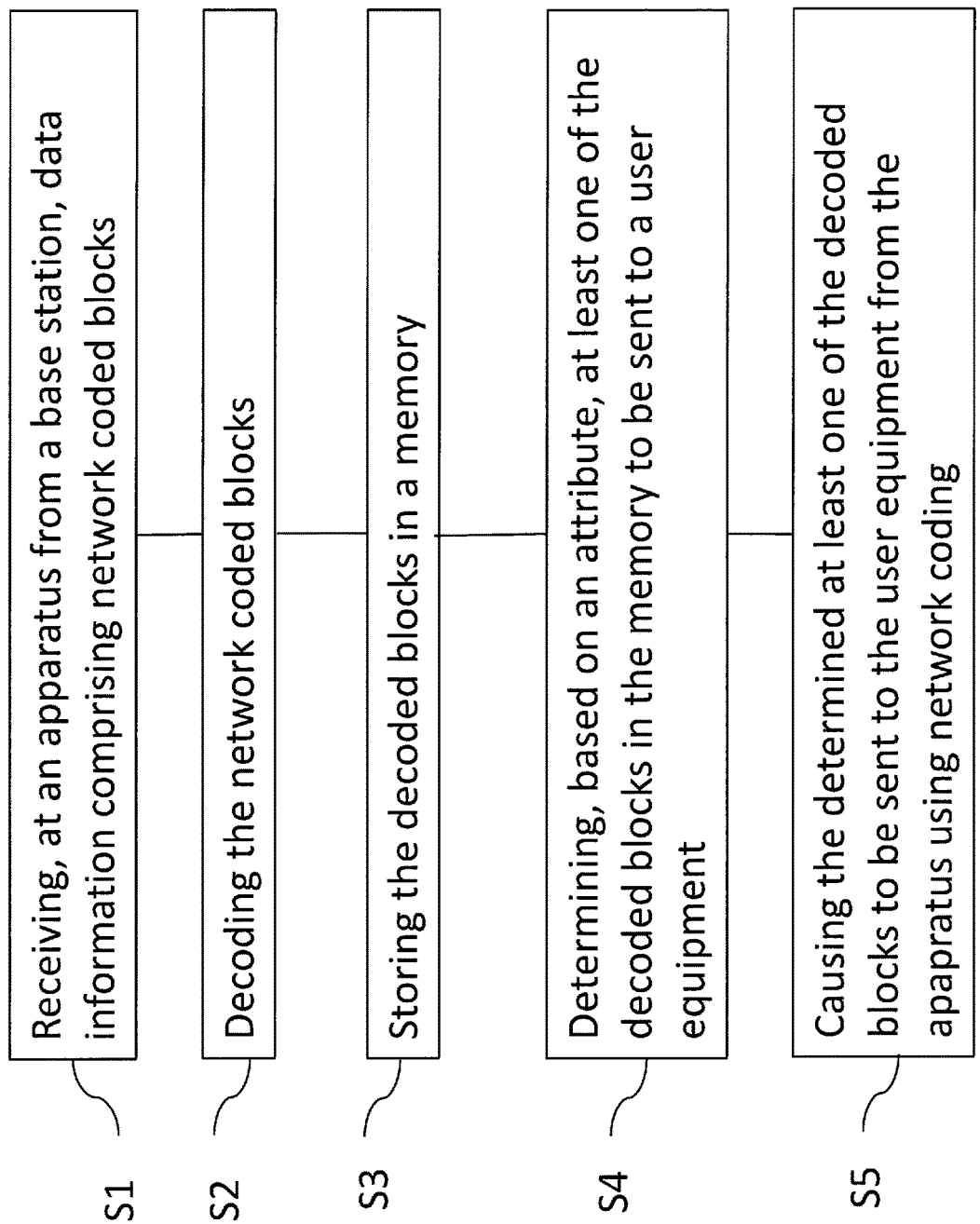
FIG. 6 shows a flowchart of a method according an embodiment.

FIG. 6 shows a flowchart of a method for selecting packets for recoding and resending by a RSU 530 to a VUE 520. The method of FIG. 6 may provide a way of choosing appropriate data from a buffer in a RSU 530 in a V2V network 500.

In a first step S1, the method comprises receiving, at an apparatus from a base station, data information comprising network coded blocks.

The base station, apparatus and user equipment may be in a vehicle-to-vehicle network. The apparatus may be a relay node, e.g. an RSU. The user equipment may be a VUE The data information may be sent using linear network coding. For example, a BS 510 may send data packets to each VUE 520 and RSU 530 using random linear network coding, e.g. $f_\alpha(x) = \sum_{i=1}^{N} \alpha_i x_i$. The coefficients $\alpha_i$ are chosen independently and uniformly from a Galois field GF(q).

In order to use random linear network coding, a BS 510 may split each original data packet into several data blocks sequentially, and determine coefficients for random linear network coding. The random linear network coding may follow the equation is given by $f_\alpha(x) = \sum_{i=1}^{M} \sum_{j=1}^{N} \alpha_{ij} x_{ij}$ where $x_{ij}$ is block from packet i and sent to VUE j, and corresponding coefficient is $\alpha_{ij}$.

In a second step S2, the method comprises decoding the network coded blocks.

In an example, the RSU 530 and the VUE 520 receive the linearly coded data packets from the BS 510. Assuming that RSU 530 to BS 510 always has better wireless channel condition than VUE 520 to BS 510, it can be assumed that the packets will be received and decoded correctly by the RSU 530. The RSU 530 then has the source bit (block) from the decoding.

In a third step S3, the method comprises storing the decoded blocks.

An apparatus may store the source bits in a memory or buffer.

In a fourth step S4, the method comprises determining, based on an attribute, at least one of the decoded blocks to be sent to a user equipment.

The attribute may be associated with the at least one of the decoded blocks. The attribute may comprise a time stamp and/or feedback information (e.g. number of NACKS associated with the at least one block).

In a fifth step S5, the method comprises causing the determined at least one of the decoded blocks to be sent to the user equipment from the apparatus using network coding.

The determined blocks at least one of the decoded blocks may be sent to a UE by random linear network coding. The coefficients may be chosen independently and uniformly from GF(q).

Determining, based on an attribute, at least one of the decoded blocks in the memory to be sent to a user equipment may comprise solving a multiple-knapsack problem.

The knapsack problem may be described as in equation 1 below. The purpose of the Knapsack problem is to select the most appropriate item from a set of items, each with a weight and a profit, which satisfies listed conditions, e.g. so that the total weight is less than or equal to a given limit and the total profit is as large as possible If there is more than one knapsack, the problem is a multiple knapsack problem.

Suppose there are in total m knapsacks and n items. The 0-1 multiple knapsack problem is given by following equations $$\max \sum_{j=1}^{m} \sum_{j=1}^{n} p_j x_{ij}. \qquad (1)$$

$$\sum_{j=1}^{n} w_i x_{ij} \leq c_i \quad \forall i \in \{1 \ldots m\}$$

$$\sum_{j=1}^{m} x_{ij} = 1 \quad \forall j \in \{1 \ldots n\}$$

$$x_{ij} = \{0, 1\}$$

where $p_j$ denotes the profit of each packet and $w_j$ is corresponding weight, $x_{ij}=1$ means item j is selected for knapsack i, otherwise $x_{ij}=0$.

One of the solution for knapsack problem is to use Lagrangian relaxation. Removing the complicating constraints from the constraint set may make the resulting sub-problem easier to solved The Lagrangian relaxation of equation is as indicated in equation (2), $$\max \sum_{j=1}^{n} p_j x_{ij} + \lambda \left( c - \sum_{j=1}^{n} w_i x_{ij} \right) \qquad (2)$$

$$\text{s.t.} \quad x_j = \{0, 1\}, \forall j$$

Where $\lambda$ is the Lagrange multiplier, the goal is that there is a certain simple solution to solve with fixed $\lambda$.

Figure 7:
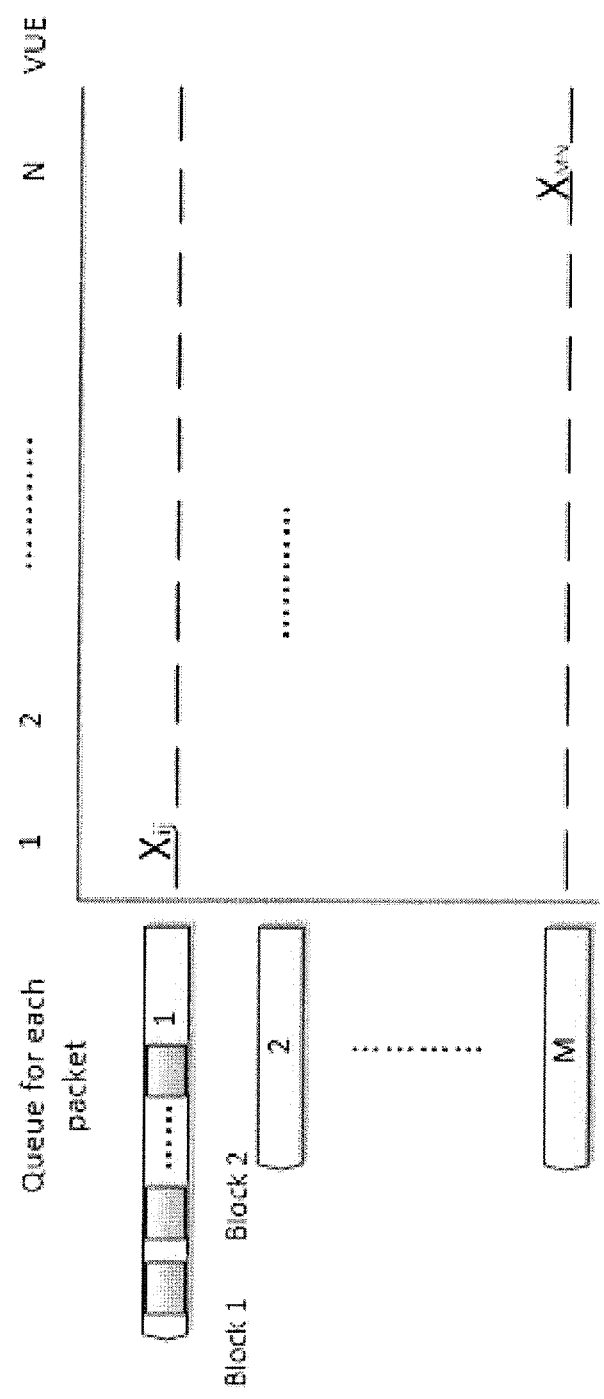
FIG. 7 shows a schematic matrix of packets in a buffer.

FIG. 7 shows an example packet matrix of blocks for selection. Each row 1-M denotes a packet comprising a number of blocks. Each column is a block sent to VUE 1-N. The optimization problem may then be summarised as equation (1). After solution of the equation, each $x_{ij}$ should be calculated. The corresponding block for which $x_{ij}=1$ may be selected as the block to be sent to the UE.

The network coded blocks received from the base station may include a time stamp, and a method may comprise determining at least one decoded block to be sent to the UE based on the time stamp.

In a V2V network 500, each moving VUE 520 which attached to an RSU 530 is temporary. After a given time interval, the VUE 520 will attach to another RSU 530. A packet may thus no longer be relevant after a delay larger than some threshold, because the corresponding VUEs 520 are beyond the RSU communication range. In order to provide expired time at RSU 530, a BS 510 may include a time stamp in each block sent to VUE 520. The RSU 530 will be aware of the time stamp after decoding the network coded packet. The time stamp may be used as a determinant factor for each block as reference for RSU 530 using random linear network coding.

That is, one criteria for block selection may be that RSU 530 determines which block is most urgent for a given UE. The most urgent and/or useful block for each VUE 520 is that whose expire time is smaller than other blocks. These packets should be decoded as soon as possible, otherwise they will not useful for retransmission on upper layer even if the packet is decoded by the physical layer at the receiver side.

$\tau_j$ is used to denote the expire time of a packet sent to UE j. When the packet is sent from a BS, its time-stamp is labelled into each block related field. When the apparatus receives and decodes the packet, apparatus may calculate expire time using the time-stamp, for example using the time stamp minus the current system time. To select the most urgent packets, the relay node chooses the maximum sum of $p_j$, where $$p_j = \frac{1}{\tau_j}.$$

Wireless channel conditions fluctuate for each VUE 520. A VUE 520 may experience bad channel conditions during broadcast of BS 510. Another criteria for block selection may be to select a block which is a missing or corrupted bit (block) for VUEs 520. When received from a BS 510, original blocks may be damaged during transmission and a VUE 520 may not be able to decode them. These missing blocks may be required by the VUE for linear network coding.

A method may comprise receiving first feedback information from the user equipment at the apparatus, the first feedback information associated with at least one of the network coded blocks sent by the base station and determining at least one of the decoded blocks to be sent to the UE based on the feedback information.

The first feedback information may comprise the feedback ACK or NAK for each block. A higher number of NAKs means that a higher number of UEs have missed the block, because data was damaged during transmission, for example.

In an example, feedback from the VUE 520 may be used to measure block priority. For one block belonging to a specific packet, the RSU 530 counts ACK/NAK for this block. If total ACK counting numbers are less than a specific threshold, the RSU 530 determines to send the block to the VUE using network coding.

If $w_i$ represents total ACK counting number for each block with respect to packet i, then the sum for a selected block should less than value $c_i$.

There may be multiple relay node decoding/encoding steps. A method may comprise receiving second feedback information from the user equipment at the apparatus, the second feedback information associated with the at least one block caused to be sent to the user equipment from the apparatus and causing the associated at least one block to be removed from the memory based on the second feedback information.

For example, after an RSU 530 causes the determined blocks to be sent using network coding to a VUE 520, the VUE 520 sends feedback to the RSU 530. The RSU 530 may update blocks based on the feedback, i.e. remove the blocks from the buffer which have been successfully decoded at the VUE 520 and acknowledged. The remaining blocks in the buffer may then be treated using the same optimization algorithm. The RSU 530 may then cause further determined blocks to be sent to the VUE 520 using network coding. The process may be terminated either when a given time period expires or, when all packets have been sent from the buffer and decoded by the VUE 520.

Figure 8:
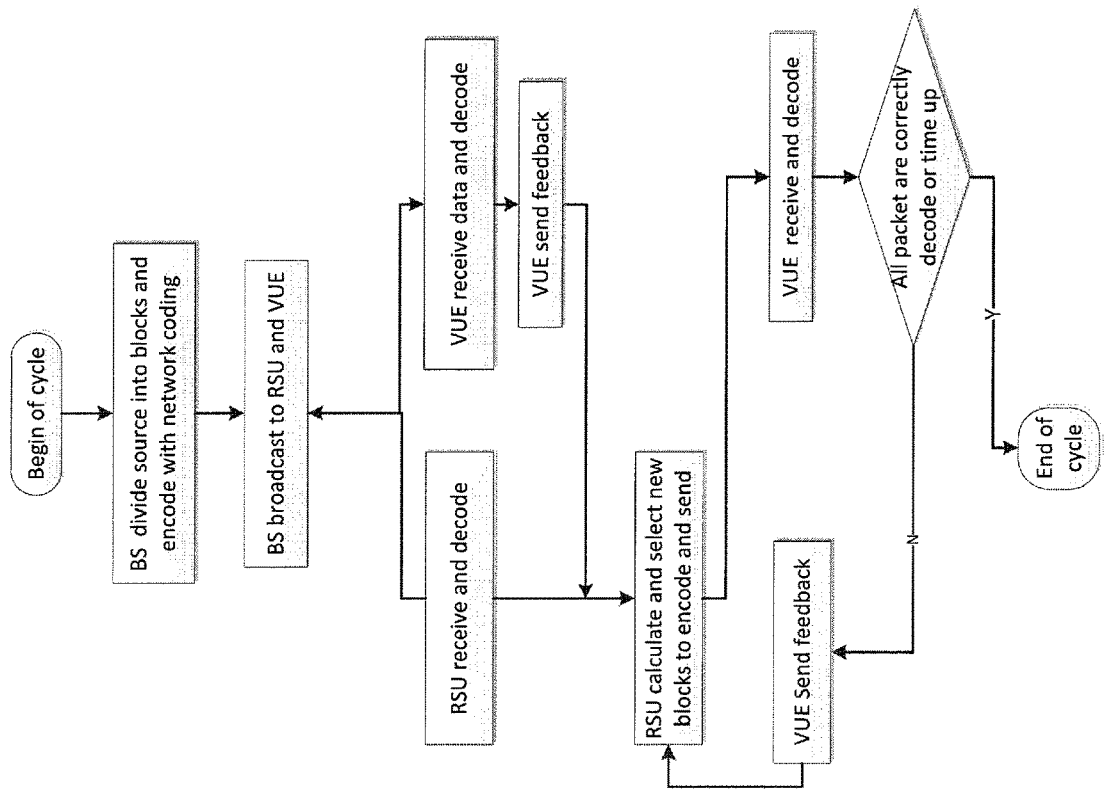
FIG. 8 shows a flowchart of a method according to an embodiment.

FIG. 8 shows a flowchart of a method for use in a V2V communication system such as that shown in FIG. 5. In a first step, the BS 510 divides source data packet into blocks and encodes the blocks with network coding.

The BS 510 broadcasts the network coded packet to RSU 530 and VUE 520.

The VUE 520 receives the network coded packet and decodes it. The VUE 520 sends feedback associated with the network coded packet. The feedback is received at the RSU 530.

The RSU 530 receives the network coded packet and decodes it. Based on an attribute, e.g, the feedback received from the VUE 520 and/or a time stamp, the RSU 530 calculates and selects blocks to encode and send to the VUE 520. The VUE 520 sends feedback associated with the network coded packet sent from the RSU 530 which is received at the RSU 530.

The process is repeated until all the packets are correctly decoded or a timer expires.

A method as described with reference to FIGS. 4 to 8 may enable an optimized block selection mechanism for random linear network coding in a V2X network.

The method may be implemented in a control apparatus as described with reference to FIG. 3. Control functions may comprise receiving, at an apparatus from a base station, data information comprising network coded blocks, decoding the network coded blocks, storing the decoded blocks in a memory, determining, based on an attribute, at least one of the decoded blocks in the memory to be sent to a user equipment and causing the determined at least one of the decoded blocks to be sent to the user equipment from the apparatus using network coding.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to V2V architecture, similar principles can be applied in relation to other networks and communication systems where relay nodes are used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
receiving, at an apparatus from a base station, data information comprising network coded blocks;
decoding the network coded blocks, wherein an expiry value is determined for each of the network coded blocks after decoding;
storing the decoded blocks in a memory;
determining, based on one or more attributes, at least one of the decoded blocks in the memory to be sent to a user equipment, wherein the one or more attributes comprises (i) at least one expiry value associated with the at least one of the decoded blocks, (ii) a number of indications of acknowledgment associated with a plurality of user equipment, and (iii) a corruption status associated with the at least one of the decoded blocks, and wherein determination of the at least one of the decoded blocks is based in part on the number of indications of acknowledgment satisfying a threshold; and
causing the determined at least one of the decoded blocks to be sent to the user equipment from the apparatus using network coding.

2. A method according to claim 1, comprising:
receiving first feedback information, associated with at least one of the network coded blocks from the base station, from the user equipment at the apparatus, wherein the first feedback information comprises the number of indications of acknowledgment and a number of indications of negative acknowledgment associated with a plurality of user equipment; and
determining at least one of the decoded blocks in the memory to be sent to the user equipment from the apparatus based on the number of indications of acknowledgment, associated with the at least one of the decoded blocks, being below a particular threshold.

3. A method according to claim 1, wherein the network coded blocks include a time stamp, and comprising:
determining at least one of the decoded blocks in the memory to be sent to the user equipment from the apparatus based on the time stamp.

4. A method according to claim 1, wherein determining at least one of the decoded blocks in the memory to be sent to the user equipment from the apparatus comprises solving a multiple knapsack problem.

5. A method according to claim 1 comprising:
receiving second feedback information from the user equipment at the apparatus, the second feedback information associated with the at least one block caused to be sent to the user equipment from the apparatus; and
causing the associated at least one block to be removed from the memory based on the second feedback information.

6. A method according to claim 1, wherein the network coded blocks are coded using random linear network coding.

7. A method according to claim 1, comprising causing the determined at least one of the decoded blocks to be sent to the user equipment from the apparatus using random linear network coding.

8. A method according to claim 1, wherein the apparatus comprises a relay node.

9. A method according to claim 1, wherein the base station, user equipment and apparatus are in a vehicle to vehicle network.

10. A method according to claim 9, wherein the apparatus comprises a roadside unit and the user equipment comprises a vehicle user equipment.

11. An apparatus comprising:
at least one processor and at least one memory including a computer program code, the at least one memory and the computer program code configured to, with the at least one processor, cause the apparatus at least to:
receive, from a base station, data information comprising network coded blocks;
decode the network coded blocks, wherein an expiry value is determined for each of the network coded blocks after decoding;
store the decoded blocks in a memory;
determine, based on one or more attributes, at least one of the decoded blocks in the memory to be sent to a user equipment, wherein the one or more attributes comprises (i) at least one expiry value associated with the at least one of the decoded blocks, (ii) a number of indications of acknowledgment associated with a plurality of user equipment, and (iii) a corruption status associated with the at least one of the decoded blocks, and wherein determination of the at least one of the decoded blocks is based in part on the number of indications of acknowledgment satisfying a threshold; and
cause the determined at least one of the decoded blocks to be sent to the user equipment from the apparatus using network coding.

12. An apparatus according to claim 11, the at least one memory and the computer program code configured to, with the at least one processor, cause the apparatus to:
receive first feedback information, associated with at least one of the network coded blocks from the base station, from the user equipment at the apparatus, wherein the first feedback information comprises the number of indications of acknowledgment and a number of indications of negative acknowledgment associated with a plurality of user equipment; and
determine at least one of the decoded blocks in the memory to be sent to the user equipment from the apparatus based on the number of indications of acknowledgment, associated with the at least one of the decoded blocks, being below a particular threshold.

13. An apparatus according to claim 11, wherein the network coded blocks include a time stamp, and the at least one memory and the computer program code configured to, with the at least one processor, cause the apparatus to:
determine at least one of the decoded blocks in the memory to be sent to the user equipment from the apparatus based on the time stamp.

14. An apparatus according to claim 11, wherein determining at least one of the decoded blocks in the memory to be sent to the user equipment from the apparatus comprises solving a multiple knapsack problem.

15. An apparatus according to claim 11, the at least one memory and the computer program code configured to, with the at least one processor, cause the apparatus to:
receive second feedback information from the user equipment at the apparatus, the second feedback information associated with the at least one block caused to be sent to the user equipment from the apparatus; and
cause the associated at least one block to be removed from the memory based on the second feedback information.

16. An apparatus according to claim 11, wherein the network coded blocks are coded using random linear network coding.

17. An apparatus according to claim 11, the at least one memory and the computer program code configured to, with the at least one processor, cause the apparatus to:
cause the determined at least one of the decoded blocks to be sent to the user equipment from the apparatus using random linear network coding.

18. An apparatus according to claim 11, wherein the apparatus comprises a relay node.

19. An apparatus according to claim 11, wherein the base station, user equipment and apparatus are in a vehicle to vehicle network.

20. A non-transitory computer-readable medium comprising instructions for causing an apparatus to perform at least the following:
receiving, at an apparatus from a base station, data information comprising network coded blocks;
decoding the network coded blocks, wherein an expiry value is determined for each of the network coded blocks after decoding;
storing the decoded blocks in a memory;
determining, based on one or more attributes, at least one of the decoded blocks in the memory to be sent to a user equipment, wherein the one or more attributes comprises (i) at least one expiry value associated with the at least one of the decoded blocks, (ii) a number of indications of acknowledgment associated with a plurality of user equipment, and (iii) a corruption status associated with the at least one of the decoded blocks, and wherein determination of the at least one of the decoded blocks is based in part on the number of indications of acknowledgment satisfying a threshold; and
causing the determined at least one of the decoded blocks to be sent to the user equipment from the apparatus using network coding.

* * * * *